US011613398B2

(12) United States Patent
Dygert et al.

(10) Patent No.: US 11,613,398 B2
(45) Date of Patent: Mar. 28, 2023

(54) CONTAINER SYSTEM AND METHOD OF MANUFACTURE

(71) Applicant: Ring Container Technologies LLC, Oakland, TN (US)

(72) Inventors: Douglas Miles Dygert, Hernando, MS (US); Douglas Alan Woodring, Somerville, TN (US)

(73) Assignee: RING CONTAINER TECHNOLOGIES, LLC, Oakland, TN (US)

( * ) Notice: Subject to any disclaimer, the term of this patent is extended or adjusted under 35 U.S.C. 154(b) by 0 days.

(21) Appl. No.: 17/515,613

(22) Filed: Nov. 1, 2021

(65) Prior Publication Data

US 2022/0048664 A1 Feb. 17, 2022

Related U.S. Application Data

(63) Continuation of application No. 16/751,598, filed on Jan. 24, 2020, now Pat. No. 11,174,061.

(51) Int. Cl.
*B65D 1/02* (2006.01)
*B29C 49/06* (2006.01)
*B65D 41/06* (2006.01)
*B29K 67/00* (2006.01)

(52) U.S. Cl.
CPC ............ *B65D 1/0246* (2013.01); *B29C 49/06* (2013.01); *B65D 1/0276* (2013.01); *B65D 41/06* (2013.01); *B29K 2067/003* (2013.01); *B65D 2501/0036* (2013.01)

(58) Field of Classification Search
CPC .... B65D 1/0246; B65D 1/023; B65D 1/0223; B65D 1/0276; B65D 1/0261; B65D 41/06; B65D 41/04; B65D 41/00; B29C 49/06; B65B 7/2835; B65B 7/28; B67B 3/20
USPC ...... 215/44, 43, 42, 329, 316, 382; 220/301, 220/293, 288; 53/490, 485, 484, 476, 53/471
See application file for complete search history.

(56) References Cited

U.S. PATENT DOCUMENTS

2007/0007232 A1\* 1/2007 Manera ................ B65D 1/0246
215/222
2020/0031532 A1\* 1/2020 Shimamoto ........ B65D 41/3428

\* cited by examiner

*Primary Examiner* — Robert J Hicks
(74) *Attorney, Agent, or Firm* — Sorell, Lenna & Schmidt, LLP (57) ABSTRACT

A plastic, hot-fillable container is provided. The container comprises a blow molded body defining a longitudinal axis. The body including a base and a neck having at least one rib disposed about at least a portion of a circumference of the neck and transverse to the axis, and at least one angled thread. The at least one rib defining a cross section having a first portion and a second angled portion. Container systems and methods of manufacturing containers are disclosed.

20 Claims, 6 Drawing Sheets

CONTAINER SYSTEM AND METHOD OF MANUFACTURE

CROSS-REFERENCE TO RELATED APPLICATIONS

This application is a continuation of U.S. patent application Ser. No. 16/751,598, filed on Jan. 24, 2020, which is hereby incorporated herein by reference, in its entirety.

TECHNICAL FIELD

The present disclosure generally relates to blow-molded containers and more particularly to plastic containers capable of high fill temperatures and pasteurization, and methods for making the same for food packaging.

BACKGROUND

Plastic blow-molded containers are commonly used for food packaging products. Many food and beverage products are sold to the consuming public in wide mouth jar-like blow-molded containers. These containers can be made from polyethylene terephythalate or other suitable plastic resins in a range of sizes. The empty blow-molded containers can be filled with food and/or beverage products at a fill site utilizing automated fill equipment.

For example, manufacture of such plastic blow-molded containers can include initially forming plastic resin into a preform, which may be provided by injection molding. Typically, the preform includes a mouth and a generally tubular body that terminates in a closed end. Prior to being formed into containers, preforms are softened and transferred into a mold cavity configured in the shape of a selected container. In the mold cavity, the preforms are blow-molded or stretch blow-molded and expanded into the selected container.

These food packaging containers are adapted to store food packaging products, however, during manufacturing and use, a neck of the container can distort due to metal cap engagement. This distortion can affect the neck configuration and compromise seal integrity between the metal cap and the container. This disclosure describes an improvement over these prior technologies.

SUMMARY

In one embodiment, a plastic, hot-fillable container is provided. The container comprises a blow molded body defining a longitudinal axis. The body includes a base and a neck having at least one rib disposed about at least a portion of a circumference of the neck and transverse to the axis. The neck including at least one angled thread. The at least one rib defining a cross section having a first portion and a second angled portion. In some embodiments, container systems and methods of manufacturing containers are disclosed.

In one embodiment, a plastic, hot-fillable food and/or beverage packaging container is provided. The container comprises a blow molded body defining a longitudinal axis. The body includes a base and a neck having a rib disposed continuously about a circumference of the neck and transverse to the axis. The neck includes a plurality of angled threads. The rib defines a cross section having a first linear portion and a second angled portion.

In one embodiment, a food and/or beverage packaging is provided. The packaging comprises a blow molded body defining a longitudinal axis. The body includes a base and a neck having a rib disposed continuously about a circumference of the neck and transverse to the axis. The neck includes a plurality of angled threads. The rib defines a cross section having a first linear portion and a second angled portion. A metal closure is engageable with the neck.

BRIEF DESCRIPTION OF THE DRAWINGS

The present disclosure will become more readily apparent from the specific description accompanied by the following drawings, in which.

DETAILED DESCRIPTION

The exemplary embodiments of blow-molded containers and more particularly, wide mouth polyethylene terephythalate (PET) containers and methods for making the same are discussed in terms of food packaging products. In some embodiments, the present container system includes a container that can be used as a replacement for glass containers. In some embodiments, the present container system includes a container having a 30 or 32 ounce container made from polyethylene terephthalate that can withstand fill and pasteurization temperatures greater than 185° F. In some embodiments, the present container system can be employed with a method of manufacture including pasteurization that can be performed for selected periods of time, for example, 10 minutes under selected temperatures. In some embodiments, the present container system includes a container weighing 42 or 45 grams and employed with a method of manufacture including blow molding and trim steps.

In some embodiments, the present container system includes a container having a horizontal ring or rib that strengthens a neck finish of the container and facilitates resistance of side load forces imparted on the neck by a cap. The rib is configured to optimize hoop rigidity while avoiding mis-capping. In some embodiments, the rib includes a horizontal upper portion and an angled lower portion. In some embodiments, if a cap is misapplied to the neck of the container, and threads of the cap engage the rib, a downward sloping edge of the angled lower portion allows the cap to slide down the neck finish to engage neck finish threads properly. In some embodiments, the rib facilitates an improved seal integrity with the cap and reduces neck distortion. In some embodiments, the rib can be continuous or is interrupted at different intervals around the neck finish.

In some embodiments, the rib can have 4 to 6 interruptions in a range from about 300 to about 360 degrees around the neck finish.

In some embodiments, during manufacture, the present container system can be run on a machine capable of a base-over stroke system. The base-over stroke system can be set at 15 millimeters (mm) to about 25 mm. In some embodiments, the operating temperature of the preform is 115 degrees Celsius to about 125 degrees Celsius and the blow mold temperature is 130 degrees Celsius to about 140 degrees Celsius. In some embodiments, a sidewall of a container of the present container system includes a PET percent crystallinity of 23% to about 32%. In some embodiments, the present container system includes a container that can maintain an initial shape at an elevated pressure of greater than 3 pounds per square inch (psi) and an elevated vacuum of greater than 3 inches of mercury (In Hg).

In some embodiments, the present container system includes a container that is manufactured via an injection molded preform, which is subjected to a blow mold and trim process. In some embodiments, the present container system includes a container that can be filled with food, food preparation oils, viscous and/or beverage products. In some embodiments, the present container system includes a container that can be employed as a cold fill container. In some embodiments, the present container system includes a container that can be employed as a hot fill container. In some embodiments, the present container system includes a container that is employed as a light weight, high strength and barrier food packaging product.

In some embodiments, the present disclosure includes a container system that is employed with a method for manufacturing food packaging having the ability to produce food packages made from PET with minimal weight and selectively desirable physical performance features, as described herein.

In some embodiments, the present container system is manufactured with selective physical performance features, such as, for example, a reduction in plastic weight, a selected pre-form design, selected bottle processing and/or bottle crystallinity of a circumferential side wall of a blown container of the present container system. In some embodiments, the selected physical performance features can include a higher injection molding efficiency and/or cavitation and an increased bi-axial orientation of PET container material. In some embodiments, the present container system includes a container that is manufactured with a smaller diameter preform, which forms a final bottle neck finish through the blowing process that allows for higher injection mold efficiency as well as improved material orientation throughout the container. In some embodiments, the container system includes a container with an improved material distribution and crystalline orientation. In some embodiments, this manufacturing method provides a container system including a container having improved top load, vacuum resistance and/or permeability. In some embodiments, this manufacturing method provides stretching PET to optimum crystalline orientation levels to improve physical performance in top load, vacuum, gas and vapor permeation through the container side wall.

In some embodiments, the present manufacturing method provides PET enhancements via improved material orientation with selective physical performance features, such as, for example, improved top load performance, improved vacuum resistance performance and/or hoop strength, improved oxygen ($O_2$) performance, and improved moisture vapor transmission rate (MVTR) performance.

In some embodiments, the present manufacturing method includes the steps of employing a single stage blow molding process and providing a preform that produces containers having a dome. In some embodiments, the method includes the step of testing the one or more preforms to ensure the one or more preforms include a selected weight and selected neck finish dimension. In some embodiments, the method includes the step of employing the one or more preforms with a four cavity production mold. In some embodiments, the method includes the step of blow molding the one or more preforms, which may comprise a container. In some embodiments, the method includes the step of trimming the one or more blow-molded preforms. In some embodiments, the step of trimming includes a spin trim operation to remove a dome from the one or more blow-molded preforms. In some embodiments, the method includes a two-stage blow molding process such that the one or more preforms are injection molded and stored before blowing the one or more preforms to produce a container.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. In some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of components of a plastic, hot-fillable container system. Alternate embodiments are also disclosed. Reference is made in detail to the exemplary embodiments of the present disclosure, which are illustrated in the accompanying figures. Turning to FIGS. 1-8, there are illustrated components of a plastic, hot-fillable container 20.

Figure 1:
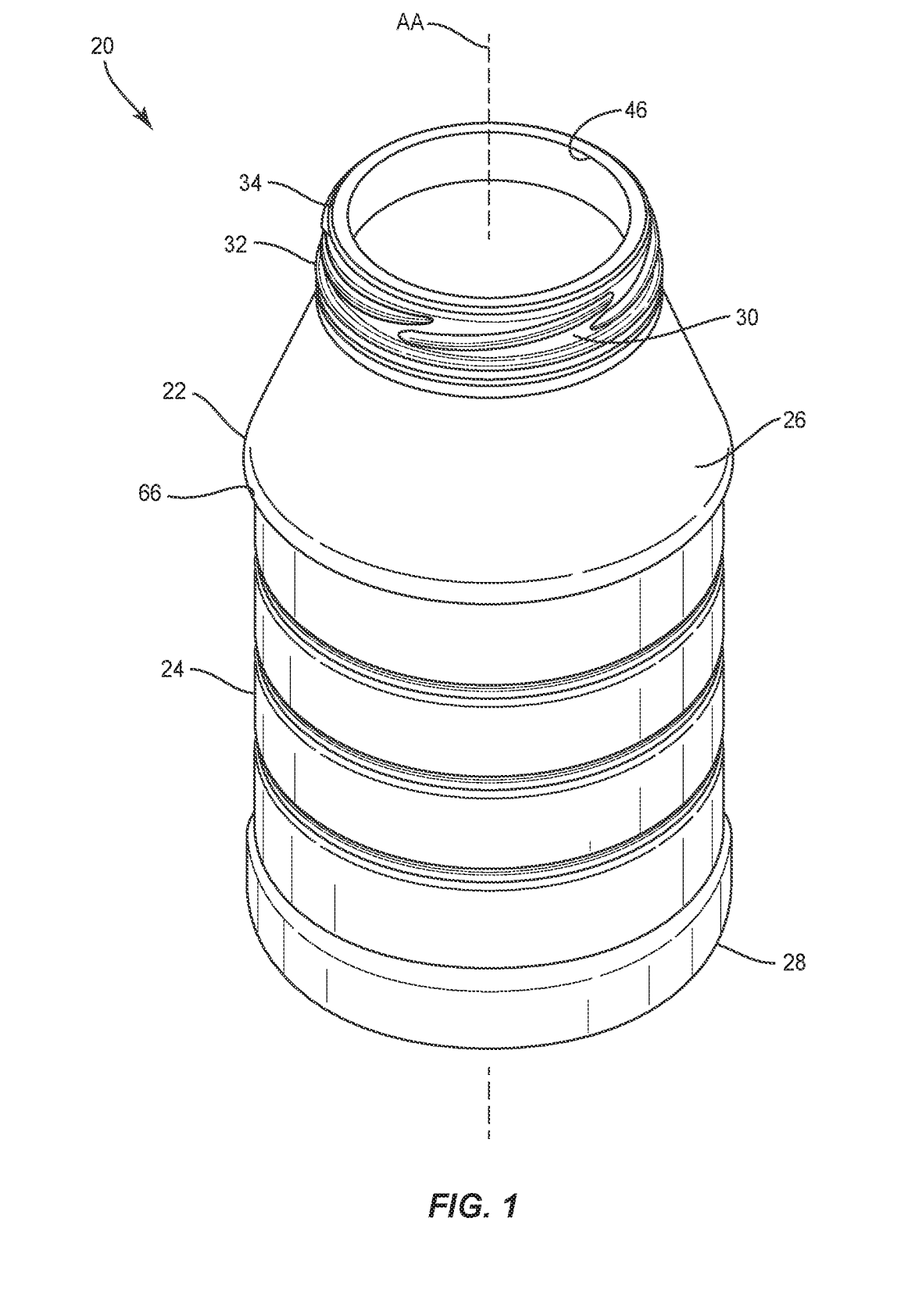
FIG. 1 is a perspective view of one embodiment of a container system in accordance with the principles of the present disclosure.
Figure 2:
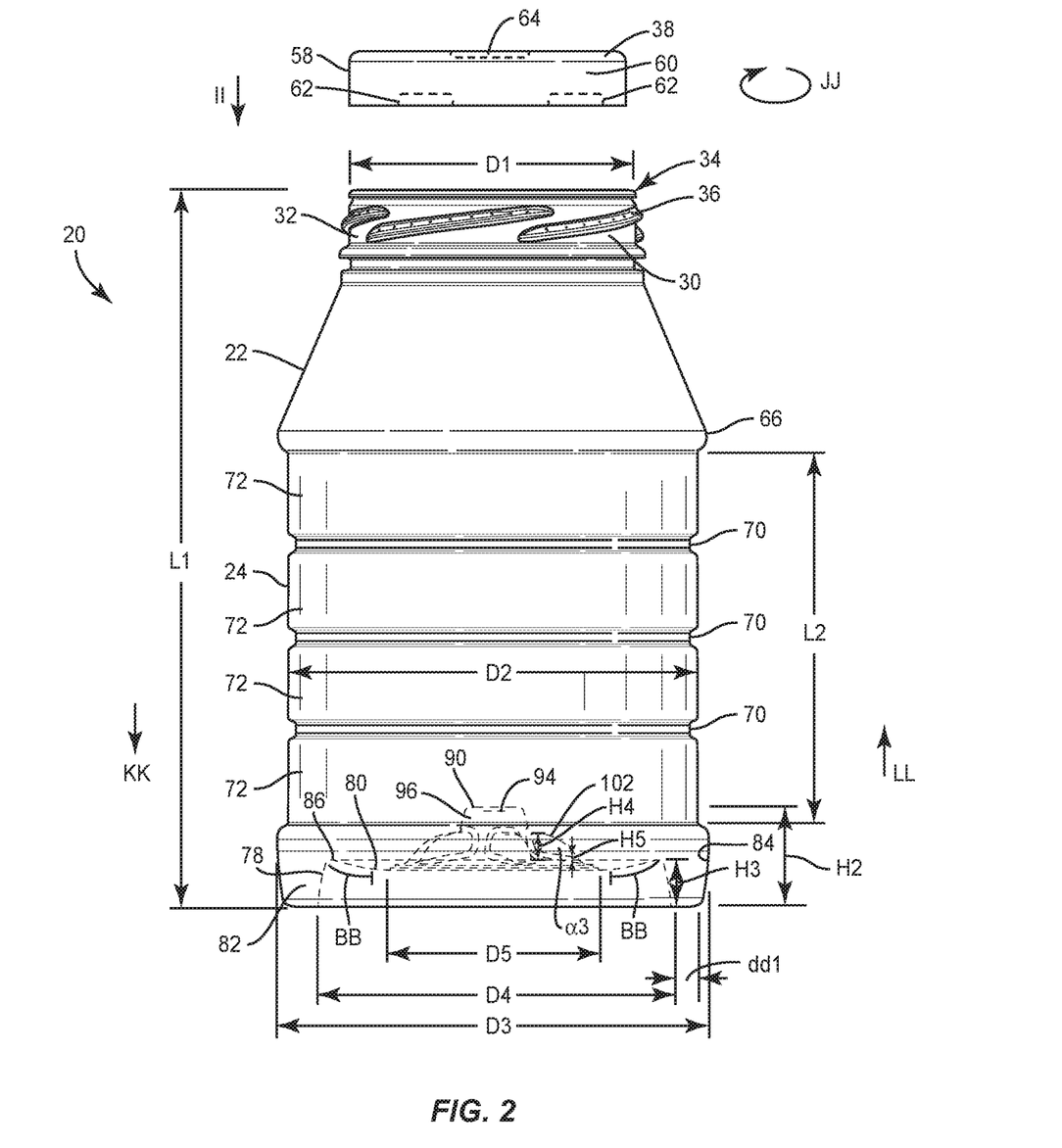
FIG. 2 is a side view of one embodiment of a container system in accordance with the principles of the present disclosure.

Container 20 is configured for storing products such as food, food preparation and/or beverages. Container 20 includes a body 22 that defines a longitudinal axis AA, as shown in FIG. 1. Body 22 has a length L1 of 6.153 inches, as shown in FIG. 2. In some embodiments, length L1 is from about 4 to about 8 inches. Body 22 includes a circumferential side wall 24 that extends between a top end 26 and a bottom end 28. Body 22 includes a substantially cylindrical configuration. In some embodiments, body 22 may include various configurations, such as, for example, oval, oblong triangular, square, polygonal, irregular, uniform, non-uniform, offset, staggered, and/or tapered. Body 22 may be manufactured by blow molding techniques, as described herein.

Figure 4:
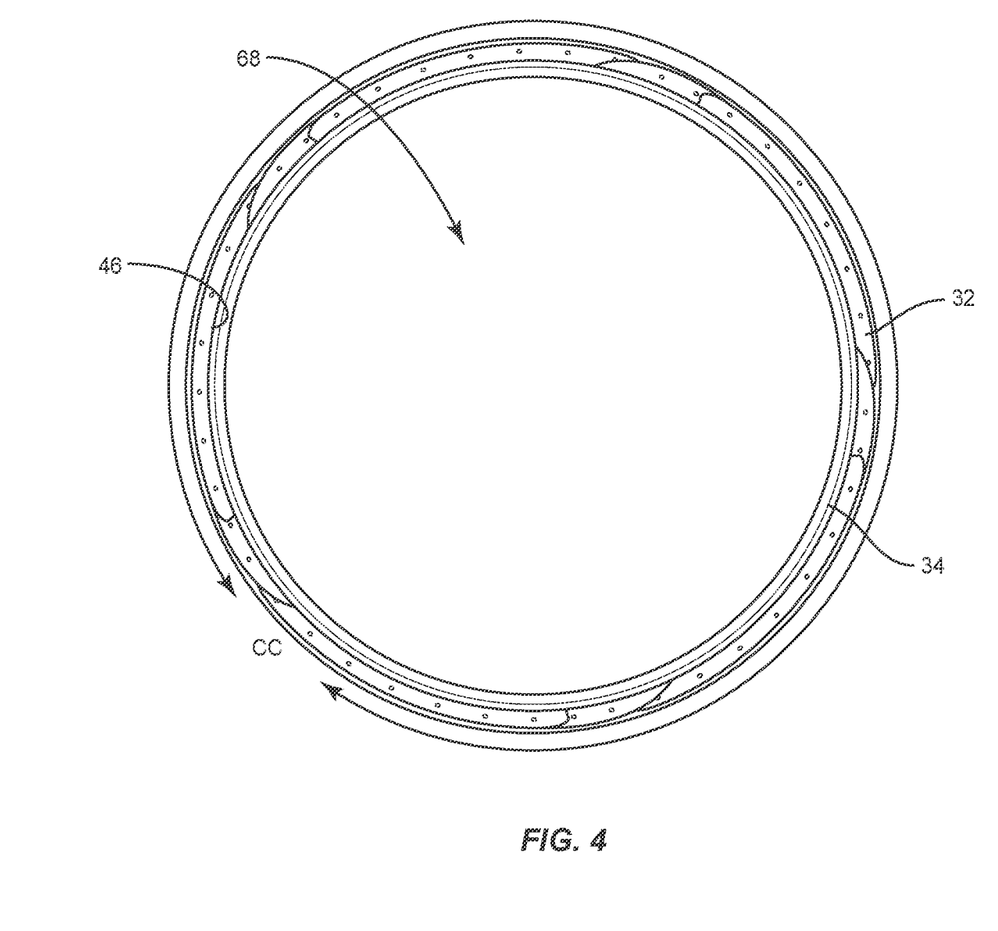
FIG. 4 is a top view of components of the container system shown in FIG. 1.

End 26 includes a surface 30. Surface 30 defines a centrally disposed cylindrical neck 32. Neck 32 includes rib 34 and a plurality of angled threads 36. Rib 34 is disposed continuously about a circumference CC of neck 32 and is transverse to axis AA, as shown in FIG. 4. Rib 34 strengthens a neck finish of neck 32 and facilitates resistance of side load forces imparted on neck 32 by a metal closure, such as cap 38, as described herein. Rib 34 is configured to optimize hoop rigidity, resist neck 32 deformation, prevent miscapping and improve seal integrity with cap 38. In some embodiments, rib 34 can be a plurality of ribs and/or can be disposed about at least a portion of circumference CC. In some embodiments, rib 34 is a plurality of 4 to 6 ribs and is not a continuous rib, and/or is disposed about at least a portion of the circumference CC of neck 32, for example, from about 300 to about 360 degrees.

Figure 6:
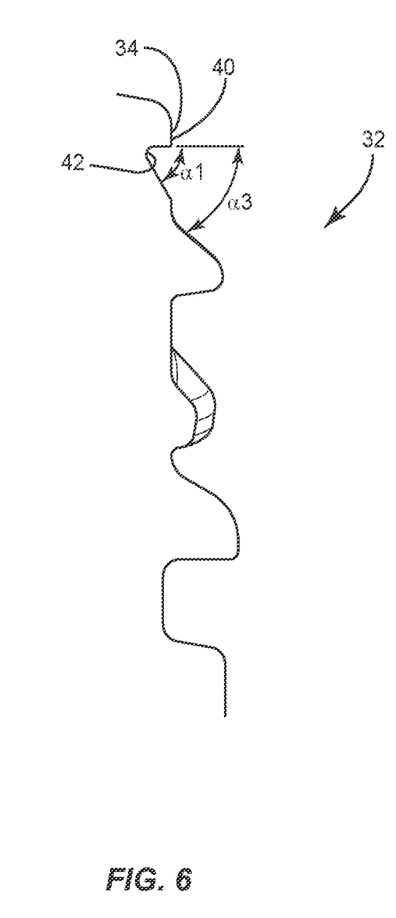
FIG. 6 is a break away side cross section view of components of the container system shown in FIG. 1.
Figure 7:
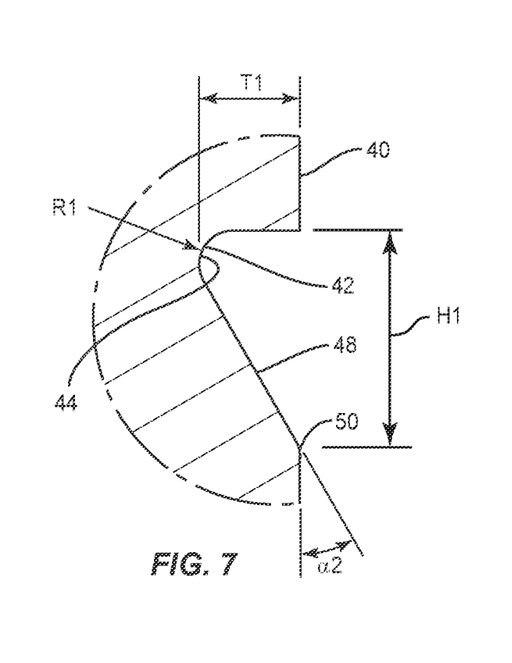
FIG. 7 is an enlarged cross-sectional view of a portion of the container system at detail C in FIG. 5.

Rib 34 has a thickness T1 of 0.030 inches, as shown in FIG. 7. In some embodiments, rib 34 has a thickness from about 0.020 to about 0.050 inches. Rib 34 defines a cross section having a first portion 40 and a second angled portion 42, as shown in FIGS. 3 and 5-7. Portion 40 is linear relative to portion 42. For example, portion 40 is straight and is parallel relative to longitudinal axis AA, while portion 42 has an angle $\alpha 1$ from about 10 to about 45 degrees, as shown in FIG. 6. Portion 40 is proximal relative to portion 42. Portion 40 and portion 42 are configured to engage with cap 38. For example, cap 38 contacts portion 40 and slides down portion 42 to properly engage with threads 36.

Portion 42 terminates at a corner 44 and in some embodiments, corner 44 has a radius R1 of 0.010 inches, as shown in FIG. 7. In some embodiments, radius R1 can be from about 0.005 to about 0.020 inches. In some embodiments, corner 44 may include various configurations, such as, for example, oval, oblong triangular, square, polygonal, irregular, uniform, non-uniform, offset, staggered, and/or tapered.

Rib 34 is positioned between an opening surface 46 of neck 32 configured for facilitating filling of container 20, and threads 36. Surface 46 has a diameter D1 of 2.322 inches. In some embodiments, diameter D1 is from about 2 to about 4 inches.

In some embodiments, rib 34 has a higher hoop strength or rigidity relative to neck 32. The hoop strength or rigidity of rib 34 adds stiffness to neck 32 so that neck 32 avoids deformation when force is applied to neck 32 during cap 38 engagement.

Figure 5:
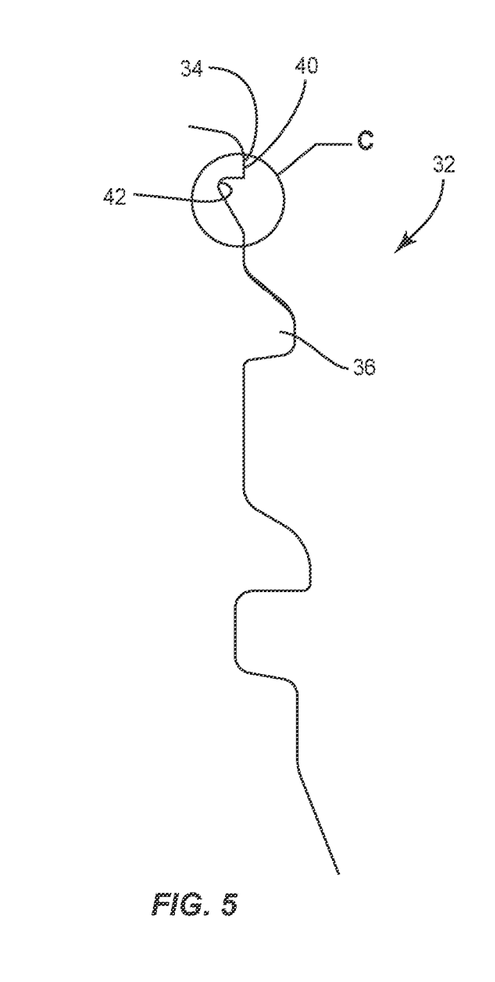
FIG. 5 is a break away side cross section view of components of the container system shown in FIG. 1.

A slope 48 terminates at an edge 50 and is disposed between rib 34 and threads 36, as shown in FIGS. 5-7. Slope 48 has an angle $\alpha 2$ that is 30 degrees, as shown in FIG. 7. In some embodiments, angle $\alpha 2$ is from about 20 to about 40 degrees. An angle $\alpha 3$ of 40 degrees is disposed between rib 34 and threads 36, as shown in FIG. 6. In some embodiments, angle $\alpha 3$ is from about 30 to about 50 degrees. Between portion 40 and edge 50 is a distance measured in height H1 from about 0.045 to about 0.085 inches, as shown in FIG. 7. In some embodiments, after cap 38 slides down portion 42, cap 38 will engage with slope 48 before cap 38 engages with threads 36.

Threads 36 are angled relative to axis AA and are spaced apart 72 degrees relative to each other. In some embodiments, threads 36 are spaced apart from about 60 to about 80 degrees relative to each other. Threads 36 have a full thread turn of 50.4 degrees. In some embodiments, threads 36 have a full thread turn from about 48 to about 52 degrees. Threads 36 have a reduced thread turn of 63.9 degrees. In some embodiments, threads 36 have a reduced thread turn from about 60 to about 66 degrees. In some embodiments, threads 36 may include various configurations, such as, for example, non-angled, irregular, uniform, non-uniform, offset, staggered, and/or tapered. In some embodiments, threads 36 include five threads.

Figure 3:
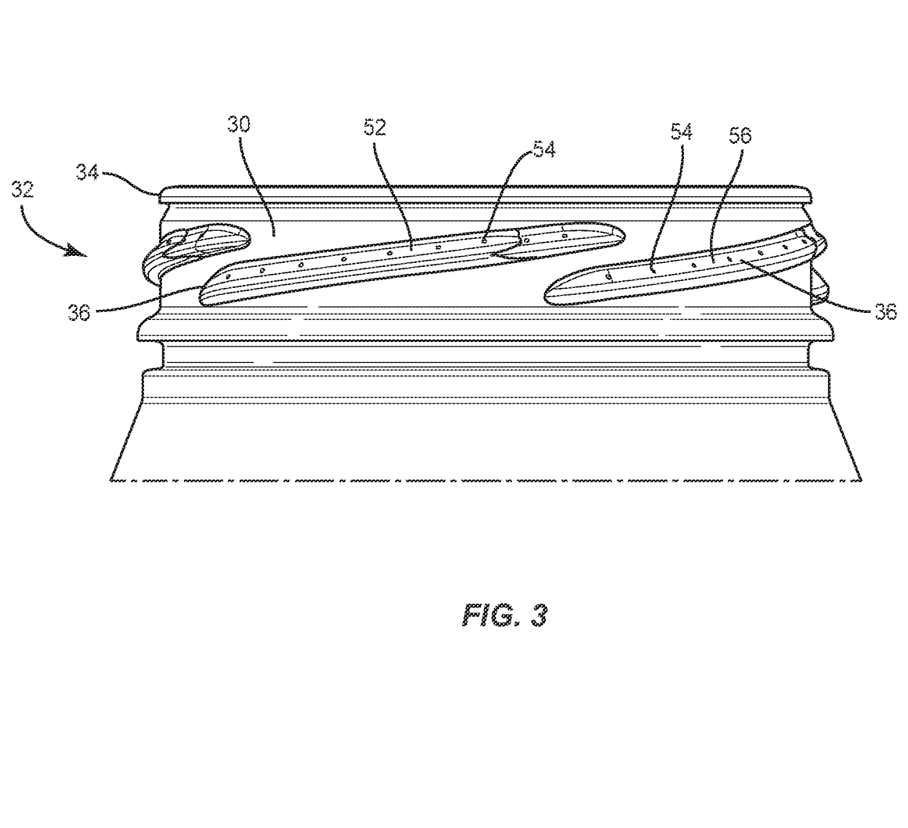
FIG. 3 is a side view of components of the container system shown in FIG. 1.

Threads 36 include an outer surface 52 defining a plurality of projections 54, as shown in FIG. 3. Projections 54 are oriented on an upper portion 56 of threads 36. In some embodiments, projections 54 may be disposed at alternate orientations, relative to portion 56, such as, for example, parallel, transverse and/or angular orientations such as acute or obtuse and/or coaxial. In some embodiments, projections 54 may include various configurations, such as, for example, oval, triangular, square, polygonal, irregular, uniform, non-uniform, offset, staggered, and/or tapered. Projections 54 include a raised grip configuration of threads 36 engageable with an inner gasket surface of cap 38 to facilitate sealing engagement of cap 38 with threads 36.

Neck 32 is configured for engagement with cap 38. A surface 58 of cap 38 defines a circumferential wall 60 that defines a plurality of inwardly facing tabs 62 that are disposed on an inner diameter of cap 38. Tabs 62 are disposed transverse relative to wall 60 and are configured for engagement with portion 42 and threads 36. For example, when cap 38 engages with rib 34 and is translated in a direction, as shown by arrow II in FIG. 2, tabs 62 slide down portion 42. When cap 38 is twisted in a direction, as shown by arrow JJ in FIG. 2, tabs 62 engage with threads 36 to fix cap 38 with neck 32. In some embodiments, tabs 62 are alternatively threading, a ledge, and/or grooves. In some embodiments, surface 58 and/or tabs 62 can be smooth, rough, textured, porous, semi-porous, dimpled, knurled, toothed, raised, grooved and/or polished.

In some embodiments, surface 58 defines a centrally disposed tamper resistant element, such as a button 64, as shown in FIG. 2. Button 64 is configured to be deflected in an upward orientation relative to surface 58 to visually indicate that cap 38 has been removed from container 20 and that container 20 has been opened. Deflection of button 64 is caused by a pressure release from within container 20 when cap 38 is disengaged from neck 32. For example, when cap 38 is rotated relative to neck 32, a seal created by neck 32 and cap 38 is released causing a decrease in the pressure within container 20.

Body 22 includes a circumferential shoulder 66 defined from surface 30 of end 26. Shoulder 66 contacts with wall 24 such that wall 24 extends from end 26 at shoulder 66 to end 28, as shown in FIGS. 1 and 2. Wall 24 is monolithic and is configured to resist deformation during filling of container 20 and/or during pasteurization of food, food preparation and/or beverages disposed within an interior chamber 68, as shown in FIG. 4. Wall 24 is able to withstand a vacuum draw of greater than 3 In Hg and is also able to withstand an amount of elevated pressure of greater than 3 psi. In some embodiments, wall 24 may include various configurations, such as, for example, oval, oblong triangular, square, polygonal, irregular, uniform, non-uniform, offset, staggered, and/or tapered. Wall 24 has a diameter D2 of 3.328 inches, as shown in FIG. 2. In some embodiments, diameter D2 is from about 3 to about 5 inches. Wall 24 has a length L2 of 3.167 inches. In some embodiments, length L2 is from about 2 to about 4 inches. In some embodiments, body 22 includes one or a plurality of walls.

Wall 24 includes a plurality of circumferential grooves 70 that are disposed perpendicular relative to longitudinal axis AA. Grooves 70 are separated by circumferential segments 72 that are defined from wall 24. Grooves 70 are configured to provide flexibility to wall 24. In some embodiments, grooves 70 may include various configurations, such as, for example, parallel, irregular, uniform, non-uniform, offset, staggered, and/or tapered.

Figure 8:
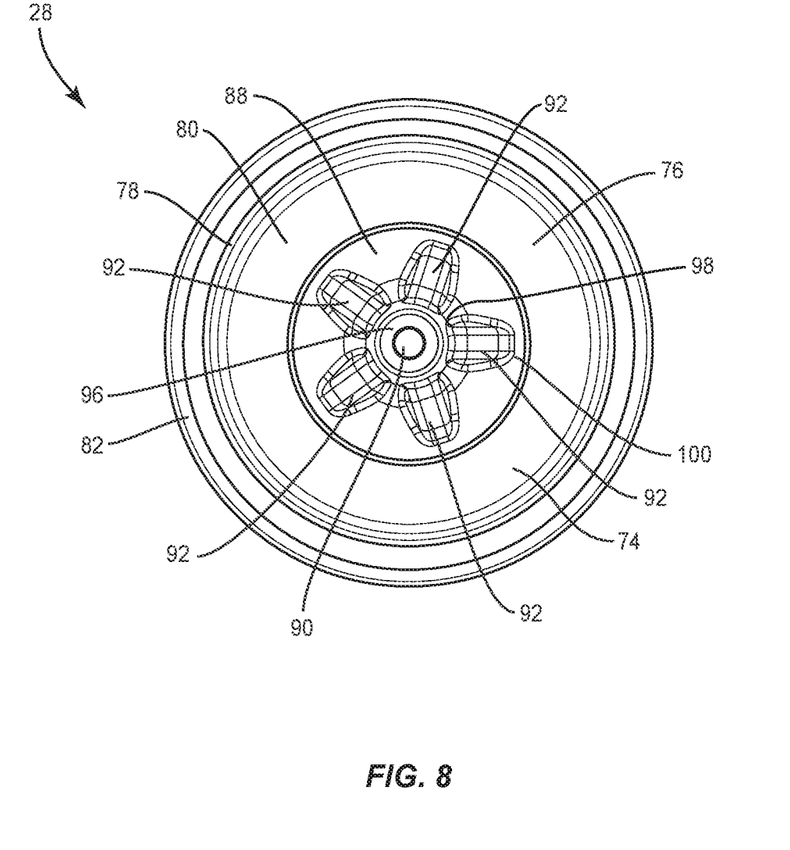
FIG. 8 is a bottom view of components of the container system shown in FIG. 1.

End 28 has a diameter D3 of 3.480 inches, as shown in FIG. 2. In some embodiments, diameter D3 is from about 3 to about 5 inches. End 28 defines a base 74, as shown in FIG. 8. Base 74 is configured to compensate for a change in volume inside of interior chamber 68 when interior chamber 68 is filled with food, food preparation and/or beverages or when said food, food preparation and/or beverages are pasteurized after container 20 is filled. Base 74 moves relative to wall 24 in response to pressure changes within interior chamber 68 to decrease and/or increase the volume as needed. For example, base 74 is movable in an outward and/or inward direction relative to wall 24 during pressure and/or vacuum application to prevent container 20 from deforming. For example, during manufacture and/or when a standard container is filled with hot products, a standard container can undesirably deform during pressure and/or vacuum application, distorting the base of the container. In some embodiments, a distorted base hinders the container's ability to stand upright on a shelf. Base 74 has a maximum height H2 of 0.852 inches. In some embodiments, height H2 is from about 0.4 to about 3.0 inches.

Base 74 includes a surface 76 that defines a circumferential wall 78 and a shelf 80 that is in direct communication with wall 78. Both wall 78 and shelf 80 extend axially inwardly into interior chamber 68, as shown in FIG. 2. Wall 78 has a maximum height H3 of 0.416 inches. In some embodiments, height H3 is from about 0.1 to about 3.0 inches. A gap 82 separates wall 78 from an interior surface 84 of interior chamber 68. Gap 82 has a distance dd1 of 0.130 inches. In some embodiments, distance dd1 is from about 0.1 to about 3.0 inches. Gap 82 prevents wall 78 from rubbing against surface 84 during inward and outer movement of base 74.

Shelf 80 is angled having an arc BB extending from an edge 86 to a centrally disposed circular panel 88, as described below. Shelf 80 has a dimeter D4 of 2.855 inches. In some embodiments, diameter D4 is from about 3.0 to about 3.5 inches.

Shelf 80 defines panel 88. Panel 88 moves outwardly and inwardly relative to wall 78 through shelf 80 during pressure and/or vacuum application. Panel 88 has a diameter D5 of 1.721 inches. In some embodiments, diameter D5 is from about 0.1 to about 3.0 inches. Diameter D5 is less than diameter D4.

Panel 88 includes a circular center portion 90 and a plurality of spaced apart radial segments 92, as shown in FIGS. 2 and 8. Portion 90 resists deformation when moving inwardly and outwardly on panel 88 relative to container 20 during pressure and/or vacuum application.

A surface 94 of portion 90 is concave, as shown in FIG. 2. Portion 90 includes a wall 96 that directly communicates with segments 92 to facilitate pressure relief in interior chamber 68.

Segments 92 are disposed circumferentially about and directly communicate with portion 90. At least a portion of each segment 92 is tapered from an inner side 98 to an outer side 100, as shown in FIG. 8. A top side 102 of each segment 92 slopes in a downward direction at an angle α3 from inner side 98 to outer side 100, as shown in FIG. 2. The slope causes each segment 92 to have a maximum height H4 at inner side 98 and a minimum height H5 at outer side 100. In some embodiments, base 74 includes one or a plurality of segments 92.

As shown in FIG. 2, prior to filling of container 20, base 74 is in its originally shaped configuration. After container 20 is filled with hot products such as food, food preparation and/or beverages or pasteurized products, positive pressure, which is pressure that is greater than that of the atmosphere, is induced in all directions inside interior chamber 68 of container 20. To compensate for pressure change in interior chamber 68, base 74 will move in an outward orientation, as shown by arrow KK relative to wall 78. In particular, shelf 80, panel 88, center portion 90 and segments 92 will move in the outward direction, and base 74 will not move beyond end 28 of container 20. After the product is cooled within interior chamber 68, vacuum is applied in all directions of interior chamber 68 and base 74 will move in an inward direction, as shown by arrow LL relative to wall 78. The position of shelf 80, panel 88, center portion 90 and segments 92 will be greater than the configuration of originally shaped base 74. For example, base 74 and its components will be disposed further within interior chamber 68 than the originally shaped configuration of base 74 is disposed.

In some embodiments, container 20 can withstand fill and pasteurization temperatures greater than 185 degrees Fahrenheit. In some embodiments, container 20 can withstand fill and pasteurization temperatures greater than 185 degrees Fahrenheit to about 220 degrees Fahrenheit.

Container 20 is made from PET. In some embodiments, container 20 may be fabricated from plastic and formed using injection and compression molding processes. In some embodiments, container 20 may be fabricated from polyester (PES), polyethylene (PE), high-density polyethylene (HDPE), polyvinyl chloride (PVC), polyvinylidene chloride (PVDC) (Saran), low-density polyethylene (LDPE), polypropylene (PP), polystyrene (PS), high impact polystyrene (HIPS), polyamides (PA) (Nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), and/or polyurethanes (PU). In some embodiments, container 20, as described herein, can be fabricated from materials suitable for food packaging products. In some embodiments, such materials include synthetic polymers such as thermoplastics, semi-rigid and rigid materials, elastomers, fabric and/or their composites.

Container 20 has a crystallinity from about 23% to about 32%. In some embodiments, a preform of container 20 can be heated and stretched to produce a container 20 having a crystallinity between about 10 and about 50%. In some embodiments, the preform of container 20 includes a molecular weight between about 120,000 g/mol and about 500,000 g/mol.

A finished PET blow-molded, container 20 is constructed for use with a selected application, as described herein. In some embodiments, the selected application includes food, food preparation oils, viscous and/or beverage products.

In some embodiments, the present manufacturing method provides PET enhancements via improved material orientation with selective physical performance features, such as, for example, improved top load performance, improved vacuum resistance performance and/or hoop strength, improved $O_2$ performance and improved MVTR performance.

In some embodiments, the present container system is employed with a method for manufacturing container 20. The method includes the steps of employing a single stage blow molding process and providing a preform that produces containers having rib 34, threads 36, base 74 including shelf 80, panel 88, center portion 90 and segments 92. In some embodiments, the method includes injection molding the preform using a two-phase injection system, wherein one phase of the two-phase injection system (e.g., a first phase) comprises injecting material into the preform and another phase of the two-phase injection system (e.g., a second phase) comprises injecting material into the preform to form a layer or multiple layers. The material used in the first phase does not include any additives. In some embodiments, the material used in the first phase is virgin PET without additives and the material used in the second phase is PET and additives. This allows the material that is used in the first phase to be reground as virgin PET so as to avoid regrinding issues discussed above.

In some embodiments, the method further comprises running container 20 on a machine capable of a base-over stroke system. The base-over stroke system is set at 15 mm to about 25 mm. In some embodiments, the operating temperature of the preform is 115 degrees Celsius to about 125 degrees Celsius and the blow mold temperature is 130 degrees Celsius to about 140 degrees Celsius.

In some embodiments, the method includes the step of testing the one or more preforms to ensure the one or more preforms include a selected weight and selected neck finish dimension. In some embodiments, the method includes the step of employing the one or more preforms with a neck 32 (e.g., including rib 34 and threads 36) production mold. In some embodiments, the method includes the step of blow molding the one or more preforms, which may comprise a container. In some embodiments, the method includes the step of trimming the one or more blow-molded preforms. In some embodiments, the step of trimming includes a spin trim operation to remove a dome from the one or more blow-molded preforms. In some embodiments, the method includes a two-stage blow molding process such that the one or more preforms are injection molded and stored before blowing the one or more preforms to produce a container. In some embodiments, the method includes reusing the dome to produce other containers, such as, for example other wide mouth containers. In some embodiments, reusing the dome includes grinding, blending, drying and adding the dome and adding the ground, blended and dried material to a melt stream, wherein the done does not contain additives.

In some embodiments, neck 32 is blow molded with rib 34 and threads 36. In some embodiments, rib 34 and threads 36 are manufactured and separately attached, applied and/or adhered to neck 32.

In some embodiments, during manufacture, container 20 is filled with food and/or beverage products at a fill site utilizing automated fill equipment. In some embodiments, the food and/or beverage products are hot due to high temperatures in the fill and pasteurization of the products. Positive pressure is induced in all directions inside interior chamber 68 of container 20 when container 20 is filled with the food and/or beverage products. In some embodiments, container 20 is capable of maintaining an initial shape at an elevated pressure of greater than 3 pounds per square inch (psi) and withstands a vacuum draw of greater than 3 In Hg during filling of container 20 with hot food and/or beverage products. During filling of container 20, base 74 is movable in an outward and/or inward direction relative to wall 78 during pressure and/or vacuum application to prevent container 20 from deforming.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A container defining a longitudinal axis, the container including a base and a neck extending from the base, the container having a thread extending about the neck, the thread defining a plurality of projections, the projections being aligned along a line that extends at an acute angle relative to the longitudinal axis.

2. The container recited in claim 1, wherein the projections are spaced apart from one another.

3. The container recited in claim 1, wherein the thread is an angled thread.

4. The container recited in claim 3, wherein the angled thread extends at the acute angle relative to the longitudinal axis.

5. The container recited in claim 1, wherein the thread comprises a plurality of angled threads, the angled threads each including a plurality of the projections.

6. The container recited in claim 5, wherein the angled threads are spaced apart from one another.

7. The container recited in claim 5, wherein at least one of the angled threads extends at the acute angle relative to the longitudinal axis.

8. The container recited in claim 1, wherein the thread comprises a five spaced apart angled threads, the angled threads each including a plurality of the projections.

9. The container recited in claim 8, wherein the angled threads are spaced apart from one another.

10. The container recited in claim 8, wherein at least one of the angled threads extends at the acute angle relative to the longitudinal axis.

11. The container recited in claim 1, wherein the projections are oriented on an upper portion of the thread.

12. The container recited in claim 1, wherein container is a plastic, hot-fillable container.

13. The container recited in claim 1, wherein the container comprises a body that includes the base and the neck, the body being a blow molded body.

14. The container recited in claim 1, wherein the thread includes a plurality of spaced apart threads, the container further comprising a metal closure having a plurality of inwardly facing tabs engageable with the threads.

15. The container recited in claim 14, wherein the threads are angled threads.

16. The container recited in claim 1, wherein the base comprises a vertical wall and a horizontal bottom panel extending from the vertical wall, the bottom panel being configured to move outwardly and inwardly relative to the vertical wall during pressure and vacuum application.

17. The container recited in claim 16, wherein the panel includes a circular center portion and a plurality of spaced apart radial segments.

18. The container recited in claim 17, wherein the center portion resists deformation when moving inwardly and outwardly on the panel relative to a body of the container during pressure and vacuum application.

19. A container comprising:
  a plastic body defining a longitudinal axis, the body including a base and a neck extending from the base, the container having a plurality of angled thread extending about the neck, the threads each defining a plurality of spaced apart projections, the projections of a respective one of the threads being aligned along a line that extends at an acute angle relative to the longitudinal axis; and a metal closure having a plurality of inwardly facing tabs engageable with the threads.

20. A container comprising:

a body defining a longitudinal axis, the body including a base and a neck extending from the base, the container having a plurality of angled threads extending about the neck, the threads each defining a plurality of spaced apart projections, the projections of a respective one of the threads being aligned along a line that extends at an acute angle relative to the longitudinal axis, wherein the base comprises a vertical wall and a horizontal bottom panel extending from the vertical wall, the bottom panel being configured to move outwardly and inwardly relative to the vertical wall during pressure and vacuum application, wherein the panel includes a circular center portion and a plurality of spaced apart radial segments, and wherein the center portion resists deformation when moving inwardly and outwardly on the panel relative to a body of the container during pressure and vacuum application.

\* \* \* \* \*